US010989596B2

(12) United States Patent
Horie et al.

(10) Patent No.: US 10,989,596 B2
(45) Date of Patent: Apr. 27, 2021

(54) SUBJECT IDENTIFICATION DEVICE AND SUBJECT IDENTIFICATION METHOD

(71) Applicant: OLYMPUS CORPORATION, Tokyo (JP)

(72) Inventors: Takuji Horie, Sagamihara (JP); Masanori Mitsui, Machida (JP); Joji Sakamoto, Hachioii (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/747,597

(22) Filed: Jan. 21, 2020

(65) Prior Publication Data

US 2020/0158572 A1    May 21, 2020

Related U.S. Application Data

(63) Continuation of application No. PCT/JP2017/027942, filed on Aug. 1, 2017.

(51) Int. Cl.
*G01J 3/02* (2006.01)
*G01J 3/28* (2006.01)
(Continued)

(52) U.S. Cl.
CPC ........... *G01J 3/2823* (2013.01); *G01J 3/0248* (2013.01); *G01J 3/40* (2013.01); *G01J 2003/1204* (2013.01); *G01J 2003/2826* (2013.01)

(58) Field of Classification Search
CPC .... G01J 3/2823; G01J 3/40; G01J 3/32; G01J 3/10; G01J 3/28; G01J 3/02; G01J 3/26; G01N 21/25
See application file for complete search history.

(56) References Cited

U.S. PATENT DOCUMENTS

2007/0058921 A1* 3/2007 Lundgren ............ G01N 21/314
                                                    385/147
2009/0295910 A1* 12/2009 Mir ....................... G01J 3/0278
                                                    348/61
(Continued)

FOREIGN PATENT DOCUMENTS

| JP | 2005-039408 A | 2/2005 |
| JP | 2012-154628 A | 8/2012 |
| JP | 2012-244277 A | 12/2012 |

OTHER PUBLICATIONS

International Search Report dated Oct. 24, 2017 issued in PCT/JP2017/027942.

*Primary Examiner* — Abdullahi Nur
(74) *Attorney, Agent, or Firm* — Scully, Scott, Murphy & Presser, P.C.

(57) ABSTRACT

A subject identification device includes: an illuminator configured to generate illumination light including components at a plurality of wavelength bands, each of the components having a characteristic in accordance with a respective one of settings; an imager configured to generate an image signal by capturing light from a subject under the illumination light having the illumination characteristic; and a processor including hardware. The processor is configured to: define an illumination characteristic of the illumination light; analyze the image signal to acquire spectral information of the subject; and cross check the spectral information of the subject with subject identification information in order to identify the subject. When the subject is not identified, the processor is configured to define another illumination characteristic that causes spectral information of potentials for the subject to be identified, and subsequently each of the imager and the processor performs a process.

7 Claims, 8 Drawing Sheets

(51) Int. Cl.
*G01J 3/40* (2006.01)
*G01J 3/12* (2006.01)

(56) References Cited

U.S. PATENT DOCUMENTS

2011/0242533 A1* 10/2011 Treado ................. G01N 21/359
356/326
2013/0265406 A1 10/2013 Mitsui
2014/0078285 A1 3/2014 Mitsui

* cited by examiner

SUBJECT IDENTIFICATION DEVICE AND SUBJECT IDENTIFICATION METHOD

This application is a continuation of International Application No. PCT/JP2017/027942, filed on Aug. 1, 2017, the entire contents of which are incorporated herein by reference.

BACKGROUND

The present disclosure relates to a subject identification device and a subject identification method.

In the related art, there is known a technique for identifying a subject based on spectral reflectance of the subject (see, for example, JP 2005-39408 A). This technique employs the spectral reflectance as a pure physical quantity belonging to the subject, so that the subject is identified at high accuracy.

SUMMARY

According to one aspect of the present disclosure, there is provided a subject identification device including: an illuminator configured to generate illumination light including components at a plurality of wavelength bands, each of the components having a characteristic in accordance with a respective one of settings; an imager configured to generate an image signal by capturing light from a subject under the illumination light having the illumination characteristic; and a processor including hardware, the processor being configured to: define an illumination characteristic of the illumination light; analyze the image signal to acquire spectral information of the subject; and cross check the spectral information of the subject with subject identification information in order to identify the subject, wherein when the subject is not identified, the processor is configured to define another illumination characteristic that causes spectral information of potentials for the subject to be identified, and subsequently each of the imager and the processor performs a process.

The above and other features, advantages and technical and industrial significance of this disclosure will be better understood by reading the following detailed description of presently preferred embodiments of the disclosure, when considered in connection with the accompanying drawings.

DETAILED DESCRIPTION

Each embodiment (hereinafter, referred to as the embodiment) will be described below with reference to the appended drawings.

Figure 1:
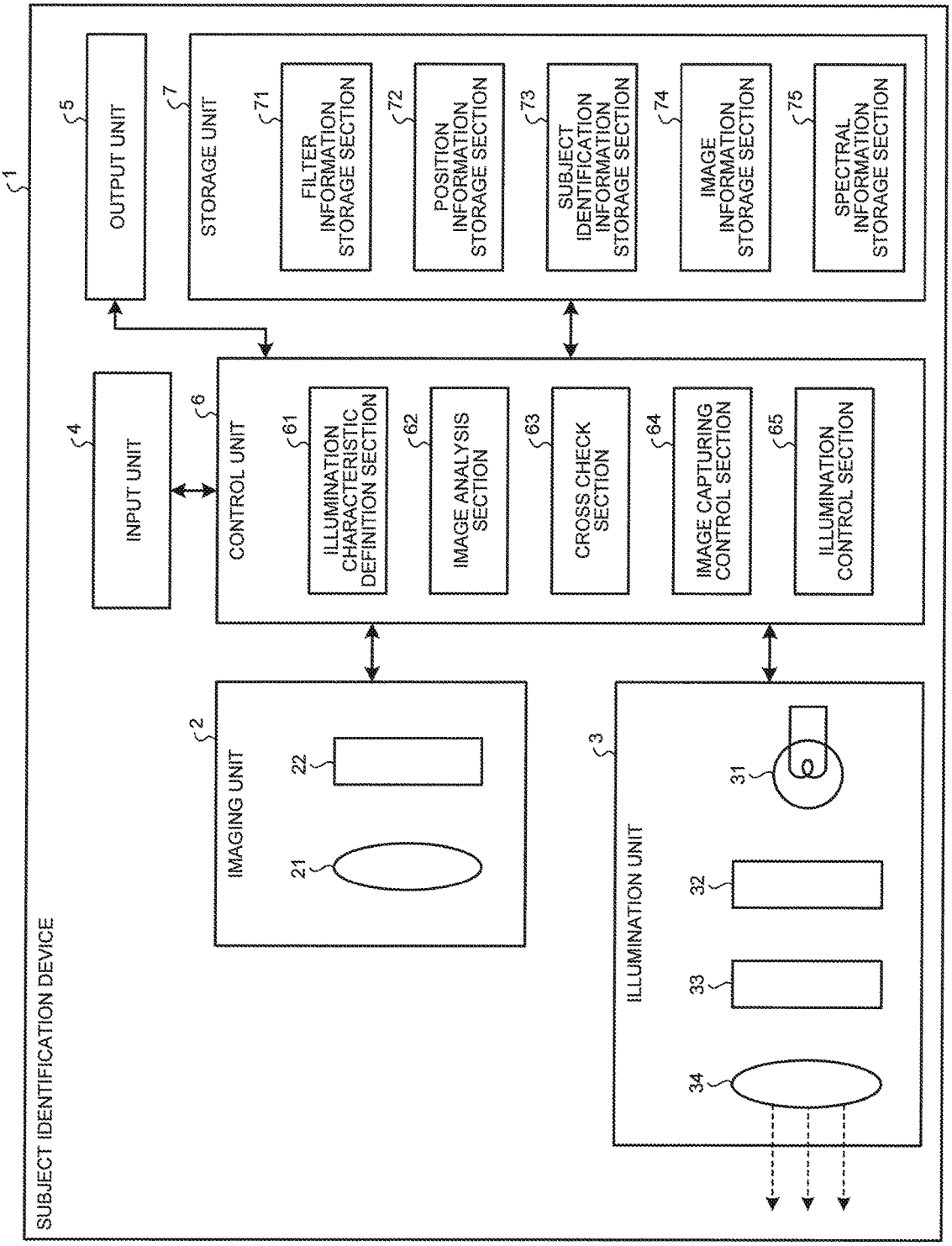
FIG. 1 is a block diagram illustrating a configuration of a subject identification device according to a first embodiment.

FIG. 1 is a block diagram illustrating a configuration of a subject identification device according to the first embodiment. A subject identification device 1 illustrated in FIG. 1 includes an imaging unit 2, an illumination unit 3, an input unit 4, an output unit 5, a control unit 6, and a storage unit 7.

The imaging unit 2 includes an imaging optical system 21 and an imaging element 22. The imaging optical system 21 collects light from a subject to form an image. The imaging element 22 performs photoelectric conversion on the light, which the imaging optical system 21 collects from the subject to form the image, to generate an image signal. The imaging optical system 21 is constituted by a single lens or a plurality of lenses. The imaging element 22 is constituted by, for example, a monochrome image sensor such as a charge coupled device (CCD) or a complementary metal oxide semiconductor (CMOS). The imaging element 22 may be an image sensor having a color filter of R, G, and B, or a multiband image sensor having four or more bands.

The illumination unit 3 includes a light source 31, a wavelength selection filter (linear variable filter; hereinafter, referred to as an LVF) 32, a liquid crystal section 33, and a diffusion optical system 34. The light source 31 emits white light, and the LVF 32 of a flat plate shape transmits the white light at a transmission wavelength varying in accordance with an incident position of the white light. The liquid crystal section 33, located closer to a side of the LVF 32 from which the light exits, selectively transmits light at a predetermined wavelength band among the light transmitted through the LVF 32. The diffusion optical system 34, located closer to a side of the liquid crystal section 33 from which the light exits, diffuses the light transmitted through the liquid crystal section 33 to equalize the light and emits the light as illumination light.

The light source 31 emits the white light by using, for example, a light emitting diode (LED) device or a laser light source. The light source 31 may be configured to emit white LED light or white laser light. Alternatively, the light source 31 may be configured to emit the white light in combination of LED light or laser light, each including red (R), green (G), and blue (B) beams, or more beams. The light source 31 may also be constituted by a xenon lamp, a halogen lamp, or the like.

Figure 2:
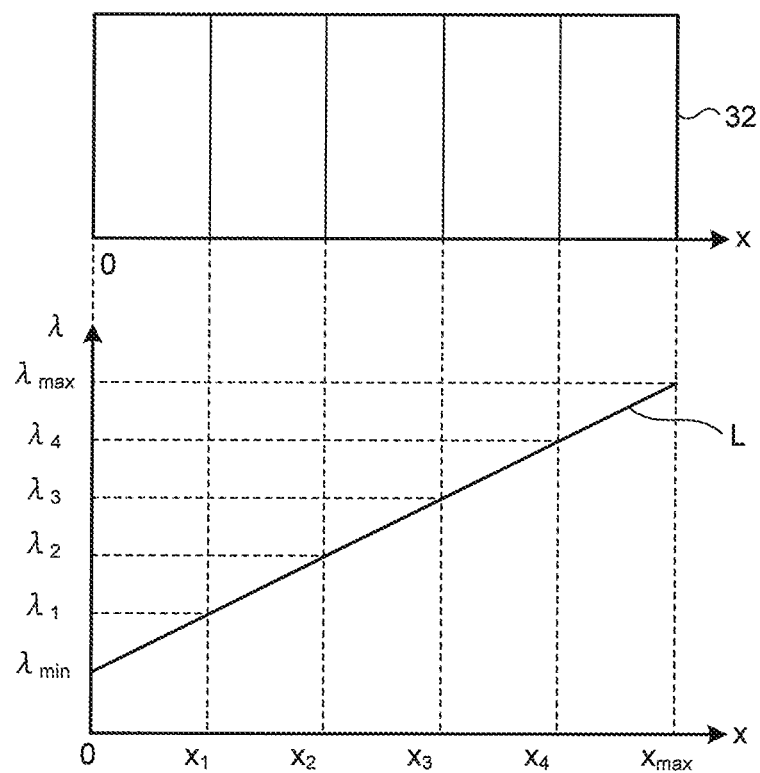
FIG. 2 schematically illustrates a characteristic of a wavelength selection filter.

The LVF 32 is flat-plate shaped and transmits the light at a transmission center wavelength that continuously changes in a direction predetermined on a main surface of the LVF 32. FIG. 2 schematically illustrates a characteristic of the LVF 32, indicating a relationship between each position of the light in the filter and the transmission center wavelength having highest transmittance at the position. In FIG. 2, a direction extending left to right and in parallel to two opposite sides of the LVF 32 is referred to as an x-axis direction. In FIG. 2, the light positioned at a left end of the LVF 32 is at x=0, and the light positioned at a right end of the LVF 32 is at $x=x_{max}$. In the LVF 32, as the position of the light in the x-axis direction changes from x=0 toward $x=x_{max}$, the transmission center wavelength λ at each of the positions continuously and linearly increases (see a straight line L in FIG. 2). The wavelength band of $\lambda_{min} \leq \lambda \leq \lambda_{max}$ represents a visible light region. For example, the transmission center wavelength $\lambda_{min}$ at x=0 (the left end of the LVF 32) equals to 380 nm, and the transmission center wavelength $\lambda_{max}$ at $x=x_{max}$ (the right end of the LVF 32) equals to 780 nm. In FIG. 2, the transmission center wavelength at $x=x_n$ (n=1 to 4; $0<x_n<x_{max}$) is expressed as $\lambda_n$. Each of four lines extending vertically in LVF 32 in FIG. 2 is a virtual line that connects positions of the light having an equal wavelength band. These lines each extend orthogonally to the x-axis direction in FIG. 2 as the direction in which the transmission center wavelength changes.

Figure 3:
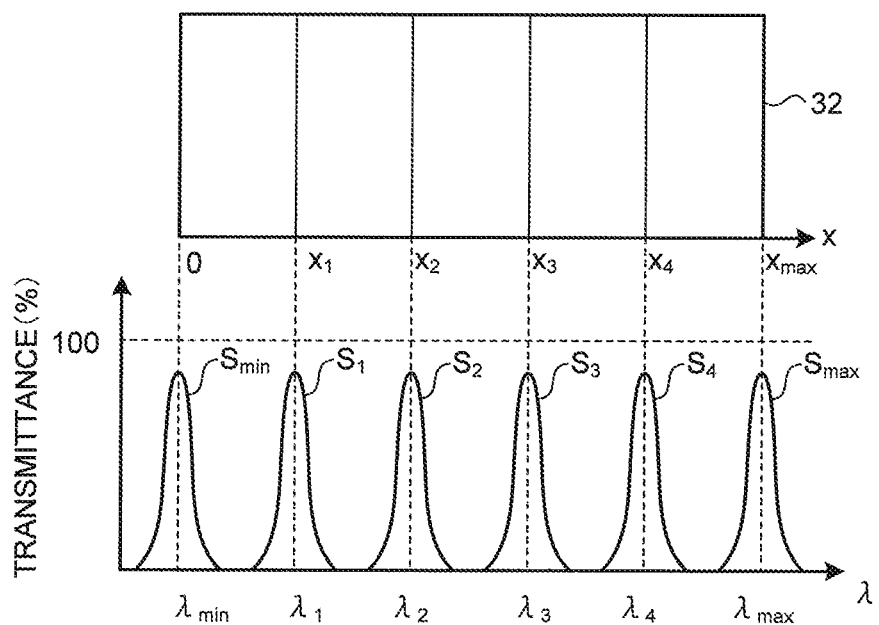
FIG. 3 schematically illustrates transmittance of light at a typical position of the wavelength selection filter.

FIG. 3 schematically illustrates the transmittance of the light at each typical position of LVF 32. FIG. 3 schematically illustrates the transmittance of the light transmitted at each of x=0, $x_n$ (n=1 to 4), and $x_{max}$. For example, a spectrum $S_{min}$ of the light transmitted at x=0 has the transmission center wavelength $\lambda_{min}$. Similarly, a spectrum $S_n$ of the light transmitted at $x=x_n$ has the transmission center wavelength $\lambda_n$, and a spectrum $S_{max}$ of the light transmitted at $x=x_{max}$ has the transmission center wavelength $\lambda_{max}$. As clearly seen in FIG. 3, the spectrum of the light transmitted at each of the positions in the LVF 32 has substantially uniform transmittance at the transmission center wavelength, and has a substantially uniform wavelength band width.

The illumination unit 3 may be constituted by other types of filters in addition to an LVF. For example, the illumination unit 3 may employ a multi-color LED light source, in which a plurality of LEDs, each emitting light in four or more colors at a different wavelength band, are two-dimensionally arranged and aligned.

The liquid crystal section 33 is located closer to the side of the LVF 32 from which the light exits, and employs a liquid crystal panel capable of selectively emitting the light at the predetermined wavelength band among the light transmitted through the LVF 32. The liquid crystal section 33 is under control of the control unit 6 and varies a liquid crystal module state in each region to selectively switch between transmission and non-transmission of the light in accordance with the incident position of the light. The transmission wavelength band of the light transmitted through the LVF 32 and the incident position of the light in the liquid crystal section 33 correspond to each other, and are stored in a position information storage section 72 of the storage unit 7 as will be described later.

Figure 4:
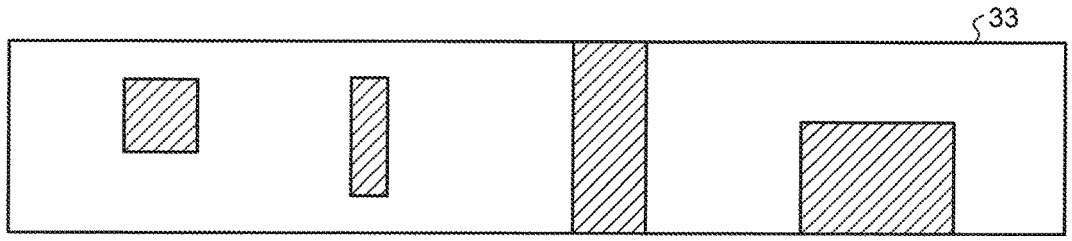
FIG. 4 illustrates an example of a region in a liquid crystal section that is selected to transmit the light.

FIG. 4 illustrates an example of a region in the liquid crystal section 33 selected to transmit the light. The region selected to transmit the light is schematically illustrated by hatched line in FIG. 4. In FIG. 4, a direction extending left to right corresponds to the direction in which the wavelength changes in the LVF 32. Each of the regions selected to transmit the light has a width in the direction extending left to right, and the width corresponds to a size of the wavelength band of the light transmitted. In FIG. 4, a height of top to bottom corresponds to a light intensity of the light transmitted. For example, among the regions selected to transmit the light, the region as the second from the right in FIG. 4 extends through top and bottom and thus transmits light at a highest light intensity level (longest wavelength component). Each of the regions selected to transmit the light may have other shapes in addition to a rectangular shape.

The diffusion optical system 34 is constituted by, for example, a diffusion plate for diffusing luminous flux, and an optical element for equalizing the luminous flux diffused by the diffusion plate. The diffusion optical system 34 is configured to diffuse the light transmitted through the liquid crystal section 33 to equalize an illuminance distribution of the light, and configured to irradiate the subject with the luminous flux as the illumination light.

The illumination unit 3 generates the illumination light composed of the components at the plurality of different wavelength bands, each of the components having a characteristic in accordance with the corresponding setting. The illumination unit 3 sequentially (in a time-divided way) emits the illumination light including each of the components. Each of the components included in the illumination light has the different wavelength bands, and the number of the wavelength bands as well as a half width of each of the wavelength bands may be inputted by a user into the input unit 4 for setting.

The input unit 4 receives various input signals including an instruction signal for operating the subject identification device 1. The input unit 4 includes an input device such as a keyboard, various buttons, or various switches, and a pointing device such as a mouse or a touch panel. The input unit 4 receives signals externally inputted by operating these devices, and outputs the signals to the control unit 6. The input unit 4 may also employ a sound input microphone.

The output unit 5 outputs various information including an image corresponding to an image signal generated by the imaging unit 2. The output unit 5 includes a monitor, e.g., liquid crystal or organic electro luminescence (EL), for outputting the various information including an image or a character, and a speaker for outputting sound.

The control unit 6 includes an illumination characteristic definition section 61, an image analysis section 62, a cross check section 63, an image capturing control section (image capturing controller) 64, and an illumination control section (illumination controller) 65.

The illumination characteristic definition section 61 defines an illumination characteristic of the illumination light emitted from the illumination unit 3. With regard to the illumination unit 3 configured as previously described, the illumination characteristic definition section 61 defines the illumination characteristic, such as a parameter for setting the portion in the liquid crystal section 33 to transmit the light. The illumination characteristic defined by the illumination characteristic definition section 61 together with a spectral characteristic of the subject estimated are stored in a spectral information storage section 75 of the storage unit 7.

The image analysis section 62 analyzes the image based on the image signal generated by the imaging unit 2 for output in order to acquire spectral information of the subject.

Specifically, the image analysis section 62 calculates an average of pixel signal values in a region of interest (ROI) predetermined in the image that corresponds to the image signal. Then, the image analysis section 62 stores the average as the spectral information into the storage unit 7 where the spectral information is in correspondence to the wavelength component of the illumination light applied to capture the image. The region of interest (ROI) is set when the input unit 4 receives an input. The ROI may be an entire part of the image. The image analysis section 62 may calculate a statistic, such as a maximum or a mode, of the pixel signal values in the ROI, instead of the average. Hereinafter, the statistic of the pixel signal values in the ROI as the spectral information will be referred to as a "spectral signal value".

The cross check section 63 cross checks the spectral information of the subject acquired by the image analysis section 62 with spectral information stored in a subject identification information storage section 73 of the storage unit 7 in order to identify the subject.

The image capturing controller 64 controls an operation of capturing the image in the imaging unit 2 by controlling, for example, a frame rate or an exposure in the imaging unit 2.

The illumination controller 65 synchronizes with the image capturing controller 64 and controls an operation in the illumination unit 3 based on the illumination characteristic defined by the illumination characteristic definition section 61. Specifically, the illumination controller 65 controls the state of the liquid crystal section 33 at a predetermined timing, so that the liquid crystal section 33 is controlled to select a pattern of transmitting the light (component) at each of the wavelengths. As a result, the illumination unit 3 generates and emits the illumination light having the illumination characteristic defined.

The control unit 6 is constituted by, for example, a general processor such as a central processing unit (CPU), or a specialized integrated circuit for performing a specific function, such as an application specific integrated circuit (ASIC) or a field programmable gate array (FPGA). The control unit 6 reads various programs stored in the storage unit 7 to perform various arithmetic processes in the subject identification device 1. These arithmetic processes include predetermined image processing performed on the image signal generated by the imaging unit 2. The predetermined image processing includes, for example, an A/D conversion, a white-balance adjustment, a γ correction, compression-expansion, or the like.

The storage unit 7 includes a filter information storage section 71, the position information storage section 72, the subject identification information storage section 73, an image information storage section 74, and the spectral information storage section 75. The filter information storage section 71 stores a transmission characteristic including the wavelength band of the light transmitted at each of the positions in the LVF 32. The position information storage section 72 stores each of the positions in the LVF 32 at which the light transmits, and the incident position of the light in the liquid crystal section 33 in correspondence to each of the positions in the LVF 32 at which the light transmits. The subject identification information storage section 73 stores information used or identifying the subject. The image information storage section 74 stores the image signal that the imaging unit 2 generates by capturing the image. The spectral information storage section 75 stores the spectral information acquired by the image analysis section 62.

The subject identification information storage section 73 stores spectral information on each of the subjects as information for specifying the corresponding subject. The spectral information, such as a relationship between the spectral signal value and the wavelength, is stored in the subject identification information storage section 73 where the spectral information is in correspondence to a name or an identification (ID) of the subject.

The storage unit 7 stores the plurality of programs and various setting information that the control unit 6 executes. The programs may be written and stored in a computer readable recording medium. The programs may be written in the storage unit 7 or the computer readable recording medium when shipping the computer or the recording medium as a product. Alternatively, the programs may be written by downloading via communication network.

The storage unit 7 is constituted by a volatile memory such as a random access memory (RAM), and a nonvolatile memory such as a read only memory (ROM). Alternatively, the storage unit 7 may be constituted by an externally mountable and computer readable recording medium, such as a memory card.

Figure 5:
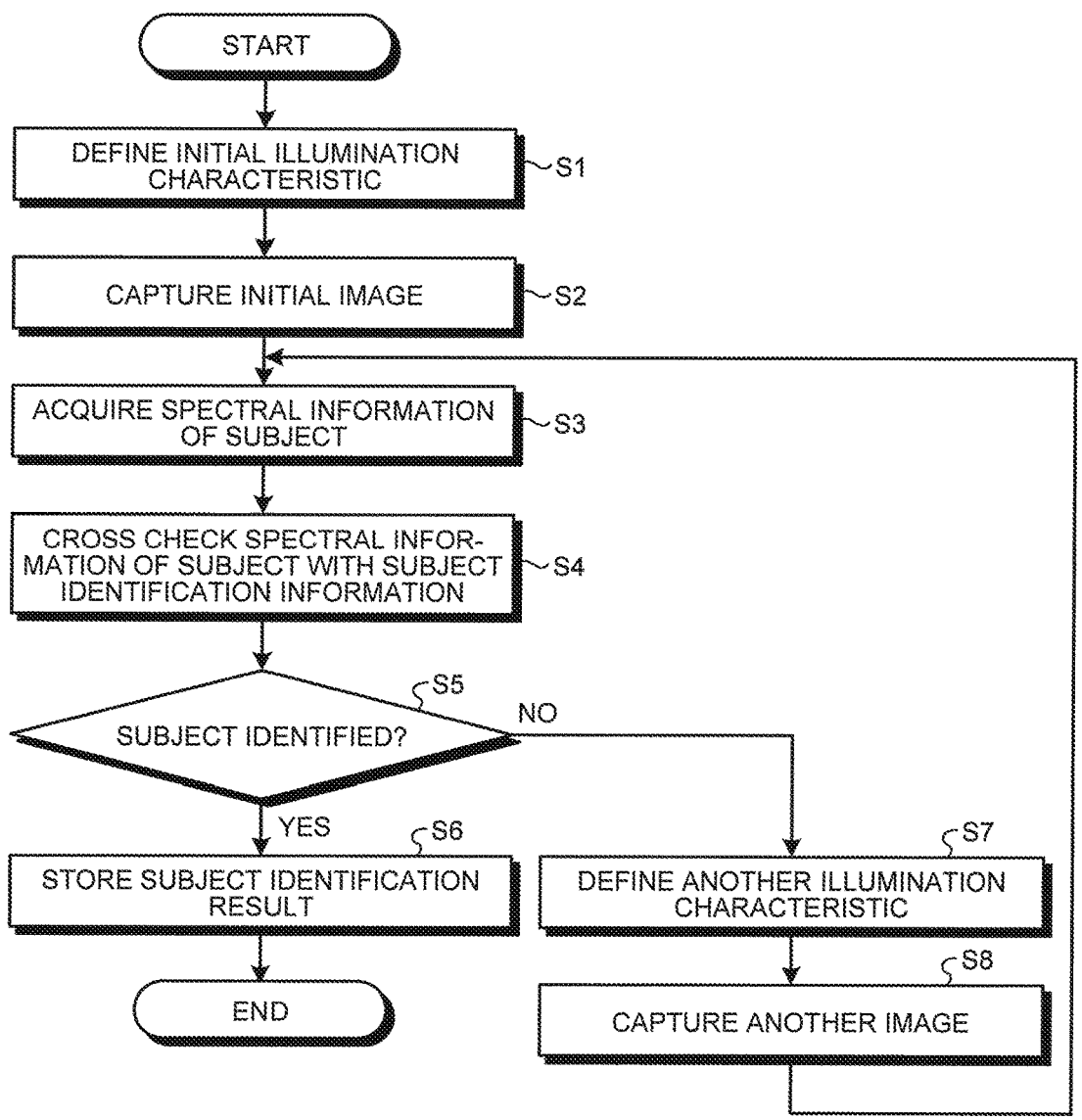
FIG. 5 is a flow chart for explaining an overview of a process performed in the subject identification device according to the first embodiment.

FIG. 5 is a flowchart for explaining an overview of a process performed in the subject identification device 1. First, the illumination characteristic definition section 61 defines an initial illumination characteristic (step S1). The initial illumination characteristic may be previously defined, or may be inputted by the user into the input unit 4 each time.

Figure 6:
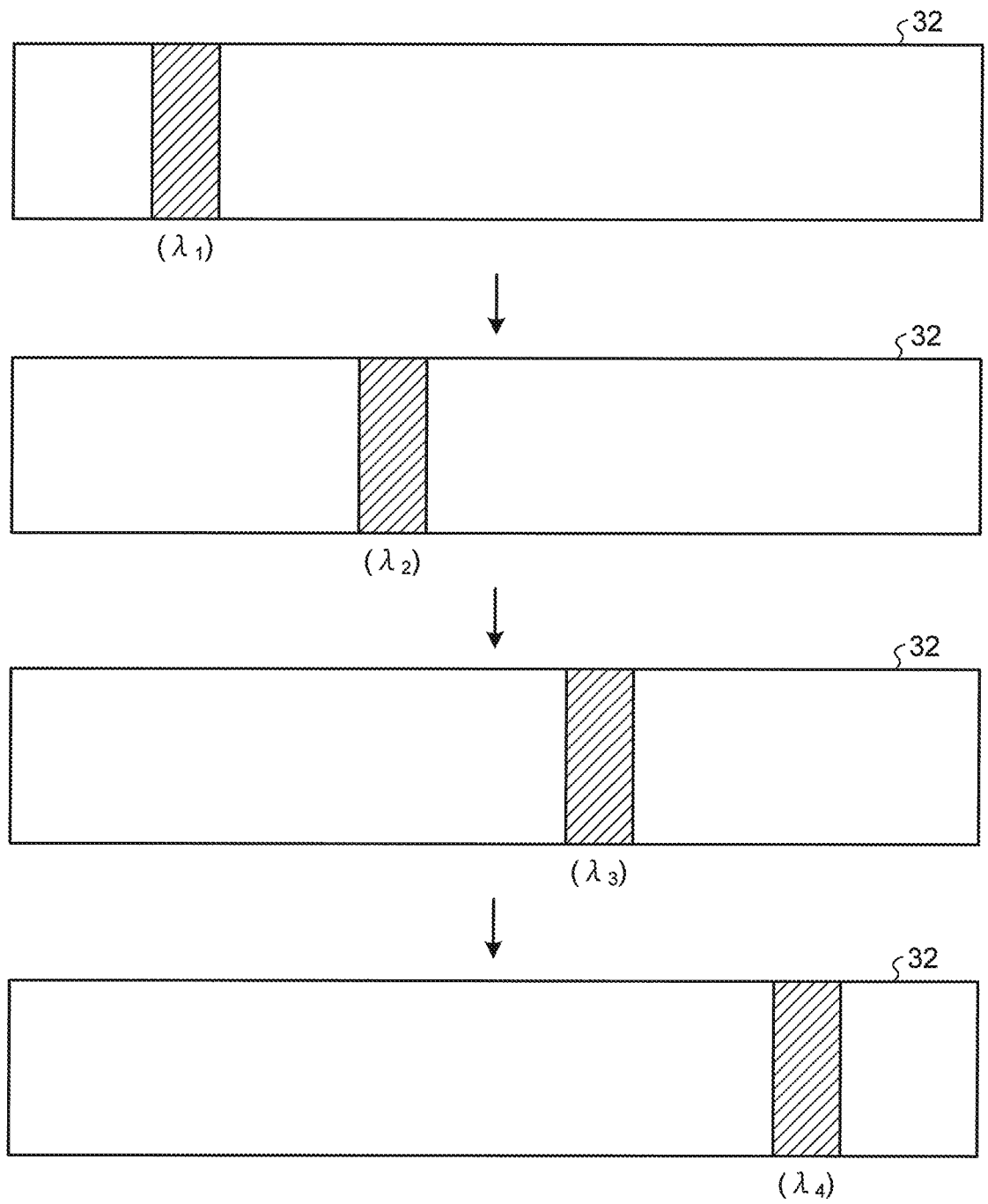
FIG. 6 illustrates an operation example in an illumination unit when an image is captured.

Subsequently, the subject identification device 1 captures an initial image (step S2). Here, the illumination controller 65 controls the illumination unit 3 to generate illumination light having the illumination characteristic defined. The image capturing controller 64 controls the imaging unit 2 to capture the image under the illumination light having the set illumination characteristic. FIG. 6 illustrates an operation example in the illumination unit 3 when the image is captured. FIG. 6 schematically illustrates each of regions in the LVF 32 at which the light transmits. In a case illustrated in FIG. 6, the illumination light at four bands of transmission center wavelengths $\lambda_1$, $\lambda_2$, $\lambda_3$, and $\lambda_4$ ($\lambda_1 < \lambda_2 < \lambda_3 < \lambda_4$) is sequentially emitted. The imaging unit 2 captures the image whenever the illumination unit 3 switches the illumination light.

Then, the image analysis section 62 analyzes an image signal that the imaging unit 2 has generated by capturing the image (pre-image capturing) so as to acquire spectral information of the subject. The image analysis section 62 stores the spectral information of the subject into the spectral information storage section 75 (step S3). As has been described above, the spectral information is, for example, a statistic of pixel signal values in a region of interest (ROI) that is set in the image corresponding to the image signal.

Figure 7:
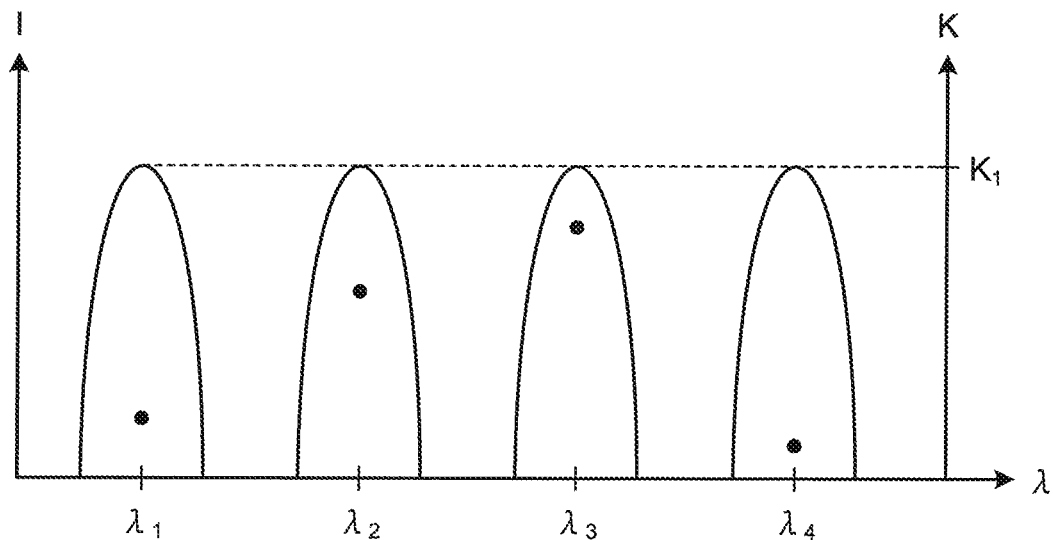
FIG. 7 illustrates a relationship between a light intensity of illumination light emitted by an illumination unit and spectral information calculated by an image analysis section based on an image signal.

FIG. 7 illustrates a relationship between a light intensity K of the illumination light emitted by the illumination unit 3 as illustrated in FIG. 6 and a spectral signal value I in the ROI as the spectral information calculated by the image analysis section 62 based on the image signal. The spectral signal value at each of the four bands is indicated by a dot (•). The maximum light intensity of the illumination light at each of the four bands is equal and indicated by $K_1$.

Figure 8:
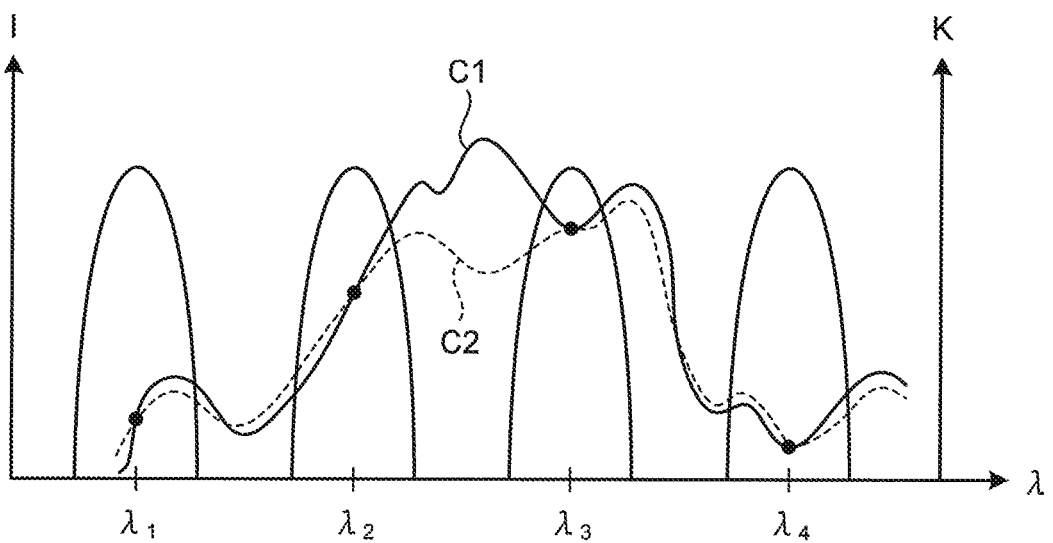
FIG. 8 schematically illustrates an overview of a cross check process performed by a cross check section.

When the step S3 ends, the cross check section 63 cross checks the spectral information of the subject with subject identification information stored in the subject identification information storage section 73 (step S4). FIG. 8 schematically illustrates an overview of cross check process steps performed by the cross check section 63. Each of a curved line C1 and a curved line C2 illustrated in FIG. 8 passes through the spectral signal value at each of the bands. Thus, in FIG. 8, the cross check section 63 has performed the cross check to acquire two pieces of subject identification information for the spectral information acquired, each piece as a potential for the subject identification.

When the cross check section 63 identifies the subject (step S5: Yes), the cross check section 63 outputs the spectral information as the subject identification result to store into the spectral information storage section 75. The spectral information is correlated to the image information and the illumination characteristic of the illumination light applied when the image was captured (step S6). When the step S6 ends, the subject identification device 1 completes a series of process steps.

In the step S5, when the cross check section 63 does not identify the subject (step S5: No), the illumination characteristic definition section 61 defines another illumination characteristic (step S7). For example, in a case illustrated in FIG. 8, the cross check section 63 extracts two potentials for the subject identification, and thus does not fully identify the subject. In other words, in the case illustrated in FIG. 8, the resolution is too low to specify the subject. In view of this, the illumination characteristic definition section 61 defines the illumination characteristic such that the two potentials for the subject identification information are clearly differentiated and the subject is thus identified. Specifically, in FIG. 8, the curved lines C1 and C2 have a larger gap in spectral signal value therebetween at a wavelength band of $\lambda_2 < \lambda < \lambda_3$ than in the other wavelength bands. In other words, the curved lines C1 and C2 are largely different in shape at the wavelength band of $\lambda_2 < \lambda < \lambda_3$, so that illumination light at the wavelength band is to be applied to the subject. With this configuration, the illumination characteristic definition section 61 changes the illumination characteristic to improve the resolution at the wavelength band where the plurality pieces of spectral information for the subject largely deviate from a predetermined reference value. The illumination characteristic definition section 61 may change the illumination characteristic by changing the maximum light intensity or the half width of the band instead of the wavelength band, or alternatively, by appropriately combining the wavelength band, the maximum light intensity, and the half width.

Figure 9:
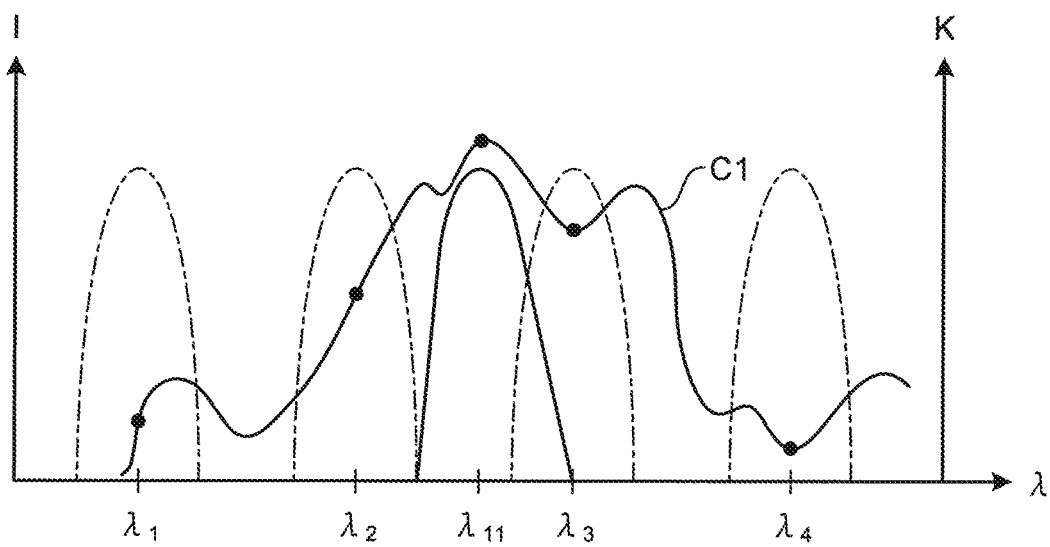
FIG. 9 illustrates a relationship between a spectral signal value and a wavelength, the relationship acquired when the cross check section in the subject identification device according to the first embodiment performs the subject identification again.

When the step S7 ends, the subject identification device 1 captures another image under the illumination light defined in the step S7 (step S8). Subsequently, the subject identification device 1 returns to the step S3 to acquire a spectral characteristic of the subject. FIG. 9 illustrates a spectral signal value at each of the wavelengths acquired in this state, along with the result acquired in the step S3 of the previous process steps. In FIG. 9, the illumination light emitted this time has a transmission center wavelength $\lambda_{11}$ that satisfies the condition of $\lambda_2 < \lambda_{11} < \lambda_3$. Further, each point indicating the spectral signal value is positioned on the curved line C1. Accordingly, in this case, the cross check section 63 determines that the spectral characteristic of the subject matches the curved line C1. In other words, in a case illustrated in FIG. 9, the cross check section 63 identifies the subject.

In the foregoing description, the cross check section 63 performs the cross check process steps twice to identify the subject; however, it is naturally to be understood that the number of these repeated cross check process steps until the cross check section 63 identifies the subject varies in accordance with the subject. Note that, when the number of definitions of the illumination characteristic exceeds a predetermined number, the subject identification device 1 may complete the series of process steps by causing the output unit 5 to output an error message indicating that the spectral information is not acquired. Alternatively, when the number of the definitions of the illumination characteristic exceeds the predetermined number, the subject identification device 1 may identify the subject by calculating a statistic of signal values at each wavelength acquired from the potentials that remain at this state. With these measures, the number of pre-image capturing is less prone to increase.

As has been described above, a subject identification device according to the first embodiment is configured, when a cross check section in the subject identification device does not fully identify a subject, to define another illumination characteristic, and subsequently perform process steps again from capturing another image of the subject until cross checking, so as to narrow down potentials for the subject identification. With this configuration, even when a plurality of subjects have similar spectral information to each other, the subject identification device accurately identifies the subject.

Figure 10:
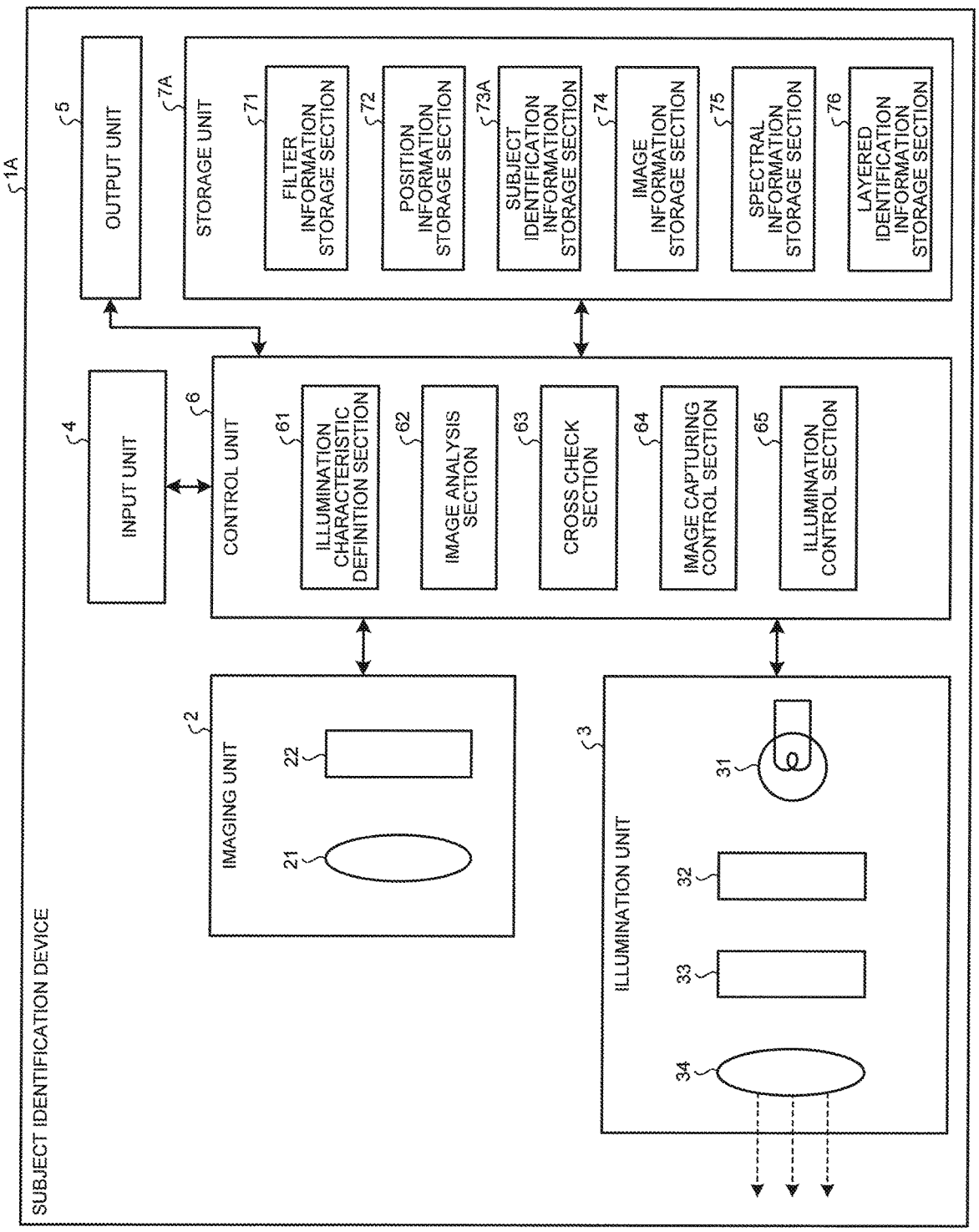
FIG. 10 is a block diagram illustrating a configuration of a subject identification device according to a second embodiment.

FIG. 10 is a block diagram illustrating a configuration of a subject identification device according to the second embodiment. A subject identification device 1A illustrated in FIG. 10 has a different configuration in a storage unit as compared with the subject identification device 1 according to the first embodiment. In descriptions below, same names and reference signs represent identical components of the subject identification device 1, and a detailed description thereof will be omitted.

A configuration of a storage unit 7A included in the subject identification device 1A will be described below. The storage unit 7A includes the filter information storage section 71, the position information storage section 72, a subject identification information storage section 73A, the image information storage section 74, the spectral information storage section 75, and a layered identification information storage section 76.

Figure 11:
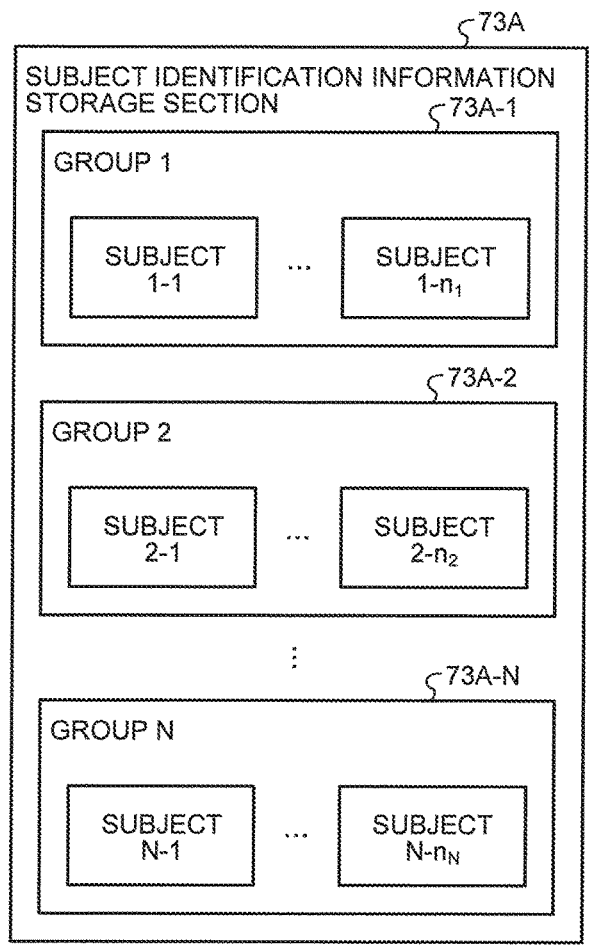
FIG. 11 is a block diagram illustrating a configuration of a subject identification information storage section included in the subject identification device according to the second embodiment.

FIG. 11 is a block diagram illustrating a configuration of the subject identification information storage section 73A. The subject identification information storage section 73A stores information for identifying a subject, and the information is divided into a plurality of groups. Specifically, the information stored is divided into N groups, i.e., a group 1: 73A-1 to a group N: 73A-N. Each of the N groups includes information for identifying a plurality of subjects. For example, a group i: 73A-i (i=1 to N) includes information for identifying the plurality of subjects (subject identification information), and the number of subjects is $n_i$, i.e., a subject i-1 to a subject i-$n_i$. Group subject identification information that each of the N groups includes is, for example, an average of spectral information for the plurality of subjects constituting the corresponding group. The group subject identification information may be a statistic, such as a maximum or a mode, of spectral information instead of the average. The group subject identification information is less in amount of information than individual subject identification information that each of the plurality of subjects includes in a lower layer of the group. In other words, the lower the layer is in each group, a greater amount of subject identification information is included. With this configuration, the lower the layer is in each group, the subject identification device 1A is required to irradiate the subject with illumination light having higher wavelength resolution in order to identify the subject.

In the subject identification information storage section 73A, each of the N groups includes $n_i$ (i=1 to N) pieces of individual subject identification information, and thus includes two layers as a whole; however, the number of the layers is merely an example. The subject identification information storage section 73A may include three or more layers, and the number of the layers included in each of the N groups may not be equal.

The layered identification information storage section 76 stores information that the cross check section 63 uses for identification in each layer. The layered identification information storage section 76 stores the group subject identification information and the individual subject identification information in each of the groups. A specific example of the identification information includes the number of bands, a center wavelength of each of the bands, and a half width of each of the bands, all included in the illumination light. The illumination characteristic definition section 61 refers to the identification information to define an illumination characteristic of illumination light that the illumination unit 3 generates. As has been described above, in the subject identification information storage section 73A, the lower the layer is in each group, the greater amount of subject identification information is included. With this configuration, the lower the layer is in each group, the subject identification device 1A is required to irradiate the subject with illumination light having higher wavelength resolution in order to identify the subject. Accordingly, the lower the layer in each group, the identification information requires the illumination light at higher wavelength resolution.

The subject identification device 1A configured as described above performs a process, and an overview of the process is similar to the overview of the process performed in the subject identification device 1 according to the first embodiment (see the flowchart illustrated in FIG. 5). In the subject identification device 1A according to the second embodiment, the cross check section 63 uses the spectral information of the subject to identify the group as the highest layer to perform a first cross check (step S4). Specifically, for example, as described with reference to FIG. 7 in the first embodiment, the illumination light at the four bands is applied for the group identification. When the result of the first cross check confirms that the group identified includes two or more subjects, the illumination characteristic definition section 61 refers to the layered identification information storage section 76 to define another illumination characteristic such that the subject in the group is identified (step S7). For example, when a spectral signal value is acquired under the illumination light illustrated in FIG. 7, two pieces of subject identification information (corresponding to the curved lines C1 and C2) are extracted as a result of the first cross check (see FIG. 8). The cross check section 63 thus does not fully identify the subject.

Then, the subject identification device 1A defines another illumination characteristic in order to identify the subject in the group. The subject identification device 1A captures another image under illumination light having the illumination characteristic defined (step S8) so as to acquire spectral information of the subject again (step S3). Subsequently, the cross check section 63 performs a second cross check (step S4). With the configuration of the subject identification information storage section 73A, the subject identification device 1A according to the second embodiment identifies the subject as a result of the second cross check.

Figure 12:
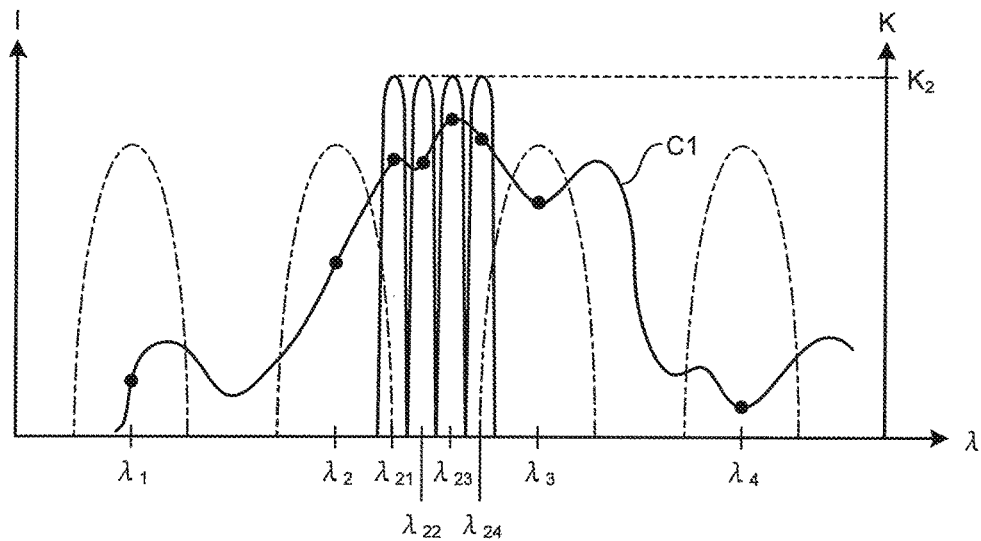
FIG. 12 illustrates a relationship between the spectral signal value and the wavelength, the relationship acquired when a cross check section in the subject identification device according to the second embodiment performs the subject identification again.

FIG. 12 illustrates a relationship between a spectral signal value and a wavelength acquired in the second cross check, along with the relationship between the spectral signal value and the wavelength in the first cross check. As illustrated in FIG. 12, the illumination light applied in the second image capturing has four bands of transmission center wavelengths $(\lambda_{21} < \lambda_{22} < \lambda_{23} < \lambda_{24})$, each of which is larger than $\lambda_2$ and smaller than $\lambda_3$. The illumination light at each of the bands applied in the second image capturing has the maximum light intensity indicated by $K_2$. $K_2$ is larger than $K_1$ that is the maximum light intensity of the illumination light at each of the bands applied in the first image capturing. Additionally, the illumination light applied in the second image capturing is smaller in half width of each of the bands than the illumination light applied in the first image capturing. As illustrated in FIG. 12, each point indicating the spectral signal value acquired in the second image capturing is positioned on the curved line C1. Accordingly, in this case, the cross check section 63 determines that the spectral characteristic of the subject matches the curved line C1. In other words, in a case illustrated in FIG. 12, the cross check section 63 identifies the subject.

As has been described above, a subject identification device according to the second embodiment is configured, even when a plurality of subjects have similar spectral information to each other, to accurately identify the subject, as with a subject identification device according to the first embodiment.

Further, the subject identification device according to the second embodiment is configured to perform a cross check process based on the subject identification information layered. When the subject is not fully identified, the subject identification device uses the subject identification information requiring a higher wavelength resolution in order to define an illumination characteristic for another cross check. With this configuration, the subject identification device reliably narrows down the potentials to identify the subject.

An embodiment has been described above; however, the present disclosure is not limited to the foregoing first or second embodiment. For example, when performing a cross check on spectral information of a subject, the cross check section 63 may extract only a predetermined number of potentials for the subject identification from the subject identification information storage section 73. The predetermined number of potentials for the subject identification have high similarity (are similar) to each other in curved line connecting each of spectral signal values. The cross check section 63 calculates the similarity based on any one of conventionally known various methods, for example, a similarity evaluation method using a correlation coefficient or an image pattern matching method. In this case, when the cross check section 63 does not identify the subject, in order to reduce the number of potentials extracted for the subject identification, the illumination characteristic definition section 61 defines an illumination characteristic of illumination light that the illumination unit 3 generates. As a result, when performing the second cross check based on an image signal generated by the imaging unit 2, the cross check section 63 extracts less number of potentials for the subject identification from the subject identification information storage section 73. With this configuration, the more cross checks are performed, the less potentials are extracted, and thus, the subject is reliably identified.

When the cross check section 63 does not eventually identify a single subject but the number of potentials extracted for the subject is under the predetermined threshold value, the cross check section 63 may store an average of the spectral information as the subject identification into the spectral information storage section 75. The cross check section 63 may employ a statistic, such as a maximum or a mode, of the spectral information, instead of the average.

The spectral information is not limited to the spectral signal values, and may be any information that reflects a spectral characteristic of the subject and is acquired based on an image captured.

The subject identification information storage section may be configured as an external database, to which the cross check section may refer via network for the cross check based on the subject identification information. Similarly, the layered identification information storage section may be configured as an external database, to which the illumination characteristic definition section may refer via network for the layered identification information.

Further, the subject may be irradiated with spot light, and based on a spectrum of light reflected from the subject, the spectral characteristic may be estimated to identify the subject. In this case, a light receiving element that receives the light reflected from the subject may acquire the spectral information, and the imaging unit is thereby not required. With this configuration, the subject is simply identified.

According to the present disclosure, a subject is accurately identified.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A subject identification device comprising:
    a light source configured to generate illumination light including components at a plurality of wavelength bands, each of the components having a characteristic in accordance with a respective one of settings;
    an image sensor configured to generate an image signal by capturing light from a subject under the illumination light having the illumination characteristic; and
    a processor comprising hardware, the processor being configured to:
        define an illumination characteristic of the illumination light;
        analyze the image signal to acquire spectral information of the subject; and
        cross check the spectral information of the subject with subject identification information in order to identify the subject,
    wherein when the subject is not identified, the processor is configured to define another illumination characteristic that causes spectral information of potentials for the subject to be identified, and subsequently each of the image sensor and the processor performs a process;
    the subject identification information is divided into a plurality of layered groups, each of the layered groups including a greater amount of information in a lower layer, and
    the processor is configured to use the subject identification information in the lower layer rather than the subject identification information that the processor used for previous cross check when repeatedly performing a cross check based on the subject identification information.

2. The subject identification device according to claim 1, wherein the processor is configured to change at least any one of: number of bands; a half width of each of the bands; and a center wavelength of each of the bands, each included in the illumination light, in order to define the other illumination characteristic.

3. The subject identification device according to claim 1, further comprising:
    a first memory configured to layer and store the subject identification information; and
    a second memory configured to store the information for identifying the subject in accordance with the subject identification information in each layer, wherein
    the processor is configured to refer to the second memory to define the illumination characteristic.

4. The subject identification device according to claim 1, wherein the processor is configured to:
    calculate a similarity between the spectral information and the subject identification information to extract the subject identification information only in a predetermined quantity in an order from the subject identification information having a highest similarity; and
    reduce the predetermined quantity whenever repeating a cross check.

5. The subject identification device according to claim 1, wherein
    the light source includes:
    a filter having a flat plate shape and configured to transmit light at a transmission center wavelength that continuously changes in a direction predetermined;
    a liquid crystal section located closer to a side of the filter from which the light exits and configured to selectively transmit the light at some of the wavelength bands among the light transmitted through the filter; and
    a diffusion optical system located closer to a side of the liquid crystal section from which the light exits and configured to diffuse the light transmitted through the liquid crystal section to equalize the light, and
    the liquid crystal section is capable of changing the wavelength bands of the light that the liquid crystal section transmits.

6. A subject identification method executed by a subject identification device that generates illumination light including components at a plurality of wavelength bands and having an illumination characteristic in accordance with a setting, and generates an image signal by capturing light from a subject, the subject identification method comprising:
    defining the illumination characteristic of the illumination light;
    generating the image signal of the subject under the illumination light having the defined illumination characteristic;
    analyzing the generated image signal to acquire spectral information of the subject;
    cross checking the acquired spectral information with subject identification information in order to identify the subject;
    defining another illumination characteristic, which causes spectral information of potentials for the subject to be identified when the subject is not identified in the cross checking, and
    performing the generating, the analyzing and the cross checking sequentially based on the other illumination characteristic;
    wherein
    the subject identification information is divided into a plurality of layered groups, each of the layered groups including a greater amount of information in a lower layer, and the subject identification information is used in the lower layer rather than the subject identification information used for previous cross check when repeatedly performing a cross check based on the subject identification information.

7. A subject identification device comprising:
a light source configured to generate illumination light including components at a plurality of wavelength bands, each of the components having a characteristic in accordance with a respective one of settings;
an image sensor configured to generate an image signal by capturing light from a subject under the illumination light having the illumination characteristic; and
a processor comprising hardware, the processor being configured to:
  define an illumination characteristic of the illumination light;
  analyze the image signal to acquire spectral information of the subject; and
  cross check the spectral information of the subject with subject identification information in order to identify the subject,
wherein when the subject is not identified, the processor is configured to define another illumination characteristic that causes spectral information of potentials for the subject to be identified, and subsequently each of the image sensor and the processor performs a process;
the light source includes:
  a filter having a flat plate shape and configured to transmit light at a transmission center wavelength that continuously changes in a direction predetermined;
  a liquid crystal section located closer to a side of the filter from which the light exits and configured to selectively transmit the light at some of the wavelength bands among the light transmitted through the filter; and
  a diffusion optical system located closer to a side of the liquid crystal section from which the light exits and configured to diffuse the light transmitted through the liquid crystal section to equalize the light, and
the liquid crystal section is capable of changing the wavelength bands of the light that the liquid crystal section transmits.

* * * * *